(12) United States Patent
Teo

(10) Patent No.: US 8,149,600 B2
(45) Date of Patent: *Apr. 3, 2012

(54) SYSTEM AND METHOD FOR RINGING SUPPRESSION IN A SWITCHED MODE POWER SUPPLY

(75) Inventor: Yong Siang Teo, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 446 days.

This patent is subject to a terminal disclaimer.

(21) Appl. No.: 12/471,200

(22) Filed: May 22, 2009

(65) Prior Publication Data

US 2010/0296318 A1   Nov. 25, 2010

(51) Int. Cl.
*H02M 3/335* (2006.01)
(52) U.S. Cl. ......... 363/21.03; 363/97
(58) Field of Classification Search .......... 363/20, 363/21.01–21.05, 21.12, 21.13, 21.18, 39, 363/40, 41, 95, 97
See application file for complete search history.

(56) References Cited

U.S. PATENT DOCUMENTS

| | | | | |
|---|---|---|---|---|
| 4,677,534 A * | 6/1987 | Okochi | ...... | 363/21.11 |
| 5,619,403 A * | 4/1997 | Ishikawa et al. | ...... | 363/21.06 |
| 5,828,558 A * | 10/1998 | Korcharz et al. | ...... | 363/20 |
| 5,982,645 A * | 11/1999 | Levran et al. | ...... | 363/37 |
| 6,049,471 A * | 4/2000 | Korcharz et al. | ...... | 363/20 |
| 6,900,995 B2 * | 5/2005 | Muegge et al. | ...... | 363/21.05 |
| 7,342,812 B2 * | 3/2008 | Piper et al. | ...... | 363/21.16 |
| 7,471,522 B2 * | 12/2008 | Ng et al. | ...... | 363/21.12 |
| 7,525,823 B2 * | 4/2009 | Piper et al. | ...... | 363/21.16 |
| 7,583,519 B2 * | 9/2009 | Piper et al. | ...... | 363/21.16 |
| 7,684,215 B2 * | 3/2010 | Park et al. | ...... | 363/21.01 |
| 7,768,802 B2 * | 8/2010 | Lee et al. | ...... | 363/21.16 |
| 7,898,823 B2 * | 3/2011 | Wu | ...... | 363/21.12 |
| 2008/0002439 A1 * | 1/2008 | Allinder | ...... | 363/21.01 |
| 2010/0315838 A1 * | 12/2010 | Mao et al. | ...... | 363/16 |

OTHER PUBLICATIONS

"Converter design using the quasi-resonant PWM controller ICE2QS01," Application Note, AN-ICE2QS01 (ANP S0003), Power Management & Supply, Infineon Technologies, Nov. 30, 2006, pp. 1-21, V1.0.

* cited by examiner

*Primary Examiner* — Adolf Berhane
(74) *Attorney, Agent, or Firm* — Slater & Matsil, L.L.P.

(57) ABSTRACT

In one embodiment, a method of operating a switched-mode power supply having a switch coupled to a drive signal is disclosed. The method includes shutting off the switch with the drive signal at a first instance of time, and comparing a magnitude of a voltage of a power supply node to a threshold after shutting off the switch. If the magnitude of the voltage of the power supply node exceeds the threshold, the switch is inhibited from turning on for a first time interval.

23 Claims, 6 Drawing Sheets

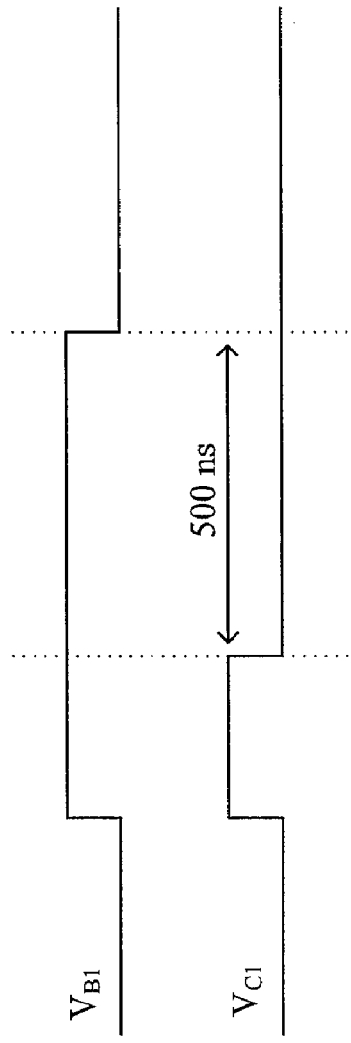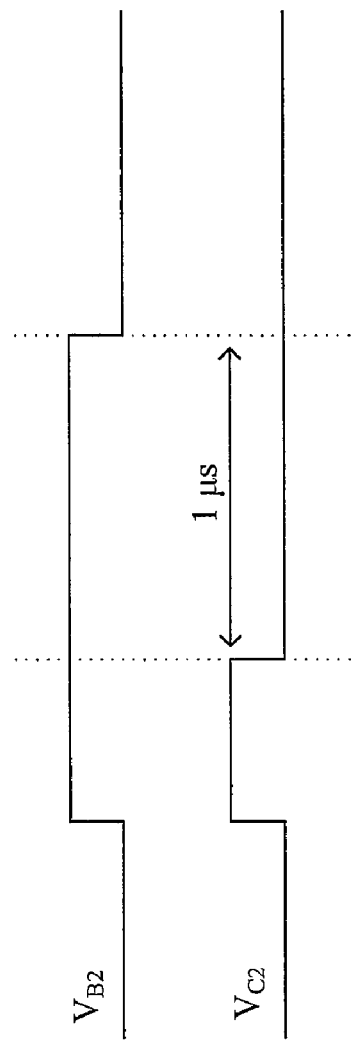

SYSTEM AND METHOD FOR RINGING SUPPRESSION IN A SWITCHED MODE POWER SUPPLY

TECHNICAL FIELD

This invention relates generally to power supply circuits, and more particularly to semiconductor circuits, and more particularly to a system and method ringing suppression in a switched mode power supply.

BACKGROUND

Switched mode power supplies are pervasive in the electronics field because of their ability to efficiently convert a first DC or AC voltage to a second regulated output level. Such power supplies are used, for example, in computer power supplies, DC power adapters, and automotive power supplies. As the demand for low power, low cost electronics have increased, a corresponding need for low cost systems and methods of switched mode power supplies has resulted.

One barrier to more efficient switched-mode power supplies has been transient ringing due to switching current in the transformer. The efficiency of a power converter is partially determined by the amount of switching loss in the transformer. This switching loss is directly proportional to the frequency of the converter. The presence of the transient ringing, however, causes mistriggering of the switching transistor, which can result in a significant increase in the system switching frequency. Mistriggering of a switch transistor due to transient ringing is disadvantageous because the resulting increased switching frequency leads to inefficient power supply performance, increased electromagnetic interference (EMI), and poor load regulation.

To address the issue of transient ringing, some conventional power supply systems have imposed a fixed turn-off time for current switches coupled to magnetic components within the power supply. Because of the wide tolerance of parts used within many power supplies, however, these fixed turn-off times are often designed to last considerably longer than a nominally expected transient. Increased turn-off time lowers the maximum realizable output power of the power supply.

In the field of switched-mode power supplies, what is needed are cost effective and power efficient systems and methods for switched-mode power supplies.

SUMMARY OF THE INVENTION

In one embodiment, a method of operating a switched-mode power supply having a switch coupled to a drive signal is disclosed. The method includes shutting off the switch with the drive signal at a first instance of time and comparing a magnitude of a voltage of a power supply node to a threshold after shutting off the switch. If the magnitude of the voltage of the power supply node exceeds the threshold, the switch is inhibited from turning on for a first time interval.

The foregoing has outlined, rather broadly, features of the present invention. Additional features of the invention will be described, hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 4*a*-4*b* illustrate a waveform diagram of an embodiment gate inhibit circuit.

Corresponding numerals and symbols in different figures generally refer to corresponding parts unless otherwise indicated. The figures are drawn to clearly illustrate the relevant aspects of embodiments of the present invention and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

The present invention will be described with respect to embodiments in a specific context, namely ringing suppression in a switched mode power supply. Embodiments of this invention may also be applied to other circuits and systems that are prone to transients during operation.

Figure 1:
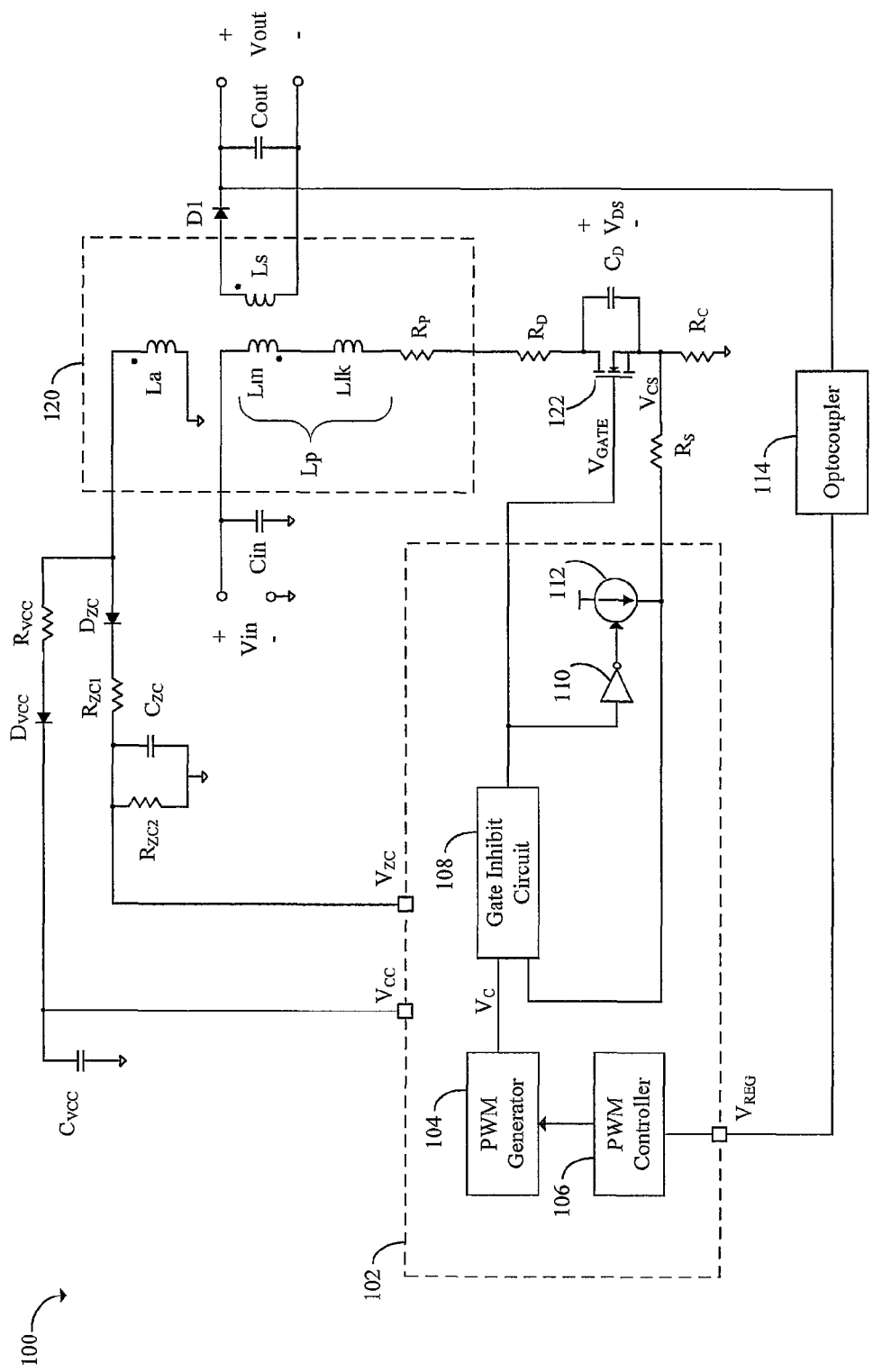
FIG. 1 illustrates a schematic of an embodiment switched-mode power supply.

A switched-mode power supply 100 according to an embodiment of the present invention is illustrated in FIG. 1, the reference numerals of which will be referred to throughout this description. Power supply 100 has power supply integrated circuit (IC) 102 containing pulse width modulation (PWM) generator 104, PWM controller 106 and gate inhibit circuit 108. Power supply IC 102 is coupled to transformer 120. Transformer 120 transfers energy directly between its primary input and secondary output in a single step and is used to convert alternating current (AC) input voltage Vin to isolated output voltage Vout. Depending on the system, specifications, and the turns ratio of transformer 120, Vin can be greater than, less than, or equal to Vout. Power supply 100 also includes power MOSFET 122 operating as a switch. PWM controller 106 controls PWM generator 104 based on feedback from optocoupler 114. In a preferred embodiment of the present invention, power supply 100 is implemented as a Quasi Resonant Flyback converter as illustrated in FIG. 1. In alternative embodiments of the present invention, however, power supply 100 can encompass another power supply topologies such as a boost, buck, or flyback converter, as examples.

Operation of power supply 100 occurs in two phases. During the first phase, transistor 122 is biased in a conductive state, drawing a linearly increasing current over time from Vin through the primary winding Lp of transformer 120. In the illustrated embodiment, a Power MOSFET is used for transistor 122. In alternative embodiments, other device types such as a BJT's, for example can be used for transistor 122. Capacitor Cin filters the input. During the second phase of operation, transistor 122 is shut-off, thereby inducing a voltage on the secondary winding, Ls of transformer 120. Diode D1 rectifies the output, which is filtered by output capacitor Cout.

The primary winding of transformer can be modeled as having two series inductances. Inductance Lm models the inductance primary winding of the transformer that is coupled to the secondary winding Ls, and Llk models the parasitic or stray inductance of the primary side of transformer 120. During the second phase, energy stored in the transformer's parasitic inductance Llk creates a transient voltage at the drain of transistor 122.

In an embodiment mode of operation, the frequency of a gate signal $V_{GATE}$ turning on and off transistor 122 is reduced with output load to reduce switching losses. This reduction in frequency is achieved by turning on transistor 122 at an increasing number of valleys (see waveform element 206 in FIG. 2b) of the drain-source voltage $V_{DS}$ through sensing of zero-crossing voltage at the $V_{ZC}$ input to power supply IC 102. Zero crossing voltage $V_{ZC}$ signal is derived from the output voltage of auxiliary winding La in transformer 120 in power supply 100 via diode $D_{ZC}$, resistors $R_{ZC1}$ and $R_{ZC2}$, and capacitor $C_{ZC}$. Energy coupled to auxiliary winding La via diode $D_{VCC}$, resistor $R_{VCC}$ and capacitor $C_{VCC}$ is also used to provide power to IC 102 in some embodiments.

In order to ensure zero crossing monitoring during a period of time starting from the instant the gate of transistor 122 is turned off, converter 100 is prevented from detecting any zero crossing voltages to reject any ringing at a zero crossing pin of transistor 122.

One barrier to more efficient switched-mode power supplies has been transient ringing at the $V_{ZC}$ pin due to switching current in the transformer. The efficiency of a QR converter is, in part, determined by the amount of switching losses in transistor 122 and transformer 120. The switching loss is directly proportional to the frequency of the converter. The presence of the transient ringing at the $V_{ZC}$ pin, however, can cause mistriggering of transistor 122 and degrade the performance of power supply 100, as discussed hereinabove.

In embodiments of the present invention, mistriggering of transistor 122 is prevented by preventing transistor from triggering until after transient ringing has dissipated though the use of gate inhibit circuit 108.

Figure 2A:
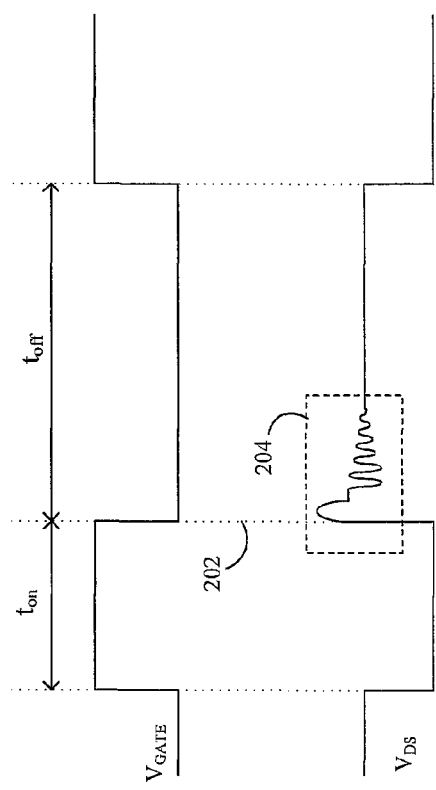
FIGS. 2*a*-2*b* illustrate waveform diagrams of signals of an embodiment switched-mode power supply.

FIG. 2a illustrates a waveform diagram of the gate drive voltage at $V_{GATE}$, and $V_{DS}$ of transistor 122 (FIG. 1). During time interval $t_{on}$, $V_{GATE}$ exceeds the turn on threshold for transistor 122. At edge 202, $V_{GATE}$, is brought low, thereby shutting off transistor 122 and beginning fixed time period $t_{off}$. When transistor 122 is shut off, the voltage at $V_{DS}$, increases and experiences an underdamped ringing response 204 due to a resonant LC circuit made primarily of Llk, and $C_D$. Resistance Rp (FIG. 1) represents the parasitic resistance of transformer 120 and is dependent on the size of the transformer designed for a specific application. In embodiments of the present invention, leakage inductance Llk is typically between about 3 µH and about 5 µH. Ringing at the drain of transistor 122, therefore, occurs in the MHz region and the ringing is dependent on transformer leakage inductance and the power MOSFET 122 drain to source capacitance. Alternative embodiments using other device types for transistor 122 can have different time domain behavior. For example, ringing response 204 can have a different amplitude envelope or frequency than is shown FIG. 2a or is described herein.

Ringing response 204 may cause instability to the quasi resonant converter because the ringing may accidentally turn on the gate prematurely. This can result in very high frequency switching for the system. The maximum power that a power converter can deliver is dependent on the peak primary current seen in primary winding Lm of transformer 120 and the switching frequency of the power converter. The maximum peak primary current is normally fixed at a certain value to protect transistor 122 from sourcing more current than transistor 122 can handle. Because the transistor 122 is coupled to inductance Lp, the longer time that transistor 122 is turned on, the higher the peak current that will be sourced by transistor 122. As discussed hereinabove, conventional methods of using a fixed shut-off time can reduce the maximum power deliverable for a power supply since the minimum switching frequency of the system is limited by the fixed shut off time $t_{off}$. On the other hand, if the fixed shut off time is not long enough and transistor 122 is turned on before transients have adequately died down, problems with the switched mode power supply due to the ringing, for example increased EMI and reduced efficiency, can occur.

In embodiments of the present invention, Gate inhibit circuit 108 senses the presence of ringing response 204 and prevents $V_{GATE}$ from being asserted until the oscillation of $V_{DS}$ falls below a given threshold. By sensing ringing response 204, sufficient time is allowed to allow transients to dissipate while still allowing for efficient operation.

Gate inhibit circuit 108 senses response 204 by monitoring the source node of transistor 122. Transients at the drain of transistor 122 are coupled to source node, $V_{CS}$ via capacitance $C_D$. In preferred embodiments of the present invention, gate inhibit circuit 108 prevents power supply IC 102 from asserting $V_{GATE}$ when ringing at $V_{CS}$ exceeds an internally set threshold of about 50 mV. When pin $V_{CS}$ exceeds an internal threshold, typically about 50 mV in some embodiments, $V_{GATE}$ is prevented from being asserted for a predetermined amount of time. The predetermined amount of time can range from 50 ns to 500 ns, depending on the targeted application. In one embodiment, $V_{GATE}$ is prevented from being asserted for about 500 ns. In alternative embodiments of the present invention, other thresholds and predetermined assertion delay times can be implemented.

In FIG. 1, transistor 122 is coupled to ground via sensing resistor Rc. Resistor Rs is coupled between the source of transistor 122 and the sense input of gate inhibit circuit 108. When VGATE is not asserted, current source 112 supplies a DC current to $R_S$ and $R_C$ in order to provide a DC level shift at the sense input to gate inhibit circuit 108. Providing a DC level shift allows for lower input voltage compliance range and may alleviate the need for gate inhibit circuit 108 to evaluate voltage $V_{CS}$ at ground potential. In alternative embodiments, current source 112 and resistor $R_S$ can be omitted, for example, if the input stage of gate inhibit circuit 108 can operate with an input near ground potential or if the source of transistor 122 is biased within the compliance range of the input to gate inhibit circuit 108. Inverter 110 and current 112 are illustrated to show the logical and functional relationship between $V_{GATE}$ and the current source 112. In embodiments, however, current source 112 is implemented according to conventional techniques known in the art.

Figure 2B:
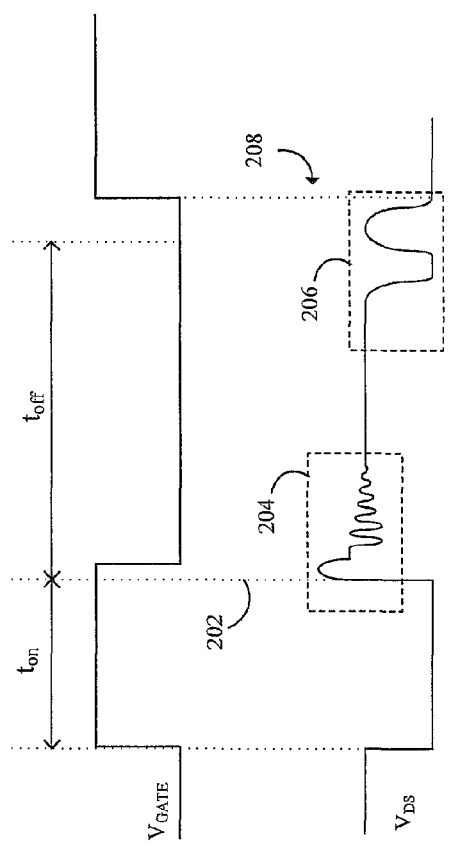

FIG. 2b illustrates an embodiment waveform diagram for a QR converter when a zero crossing detector is in operation. Waveform $V_{DS}$ shows ringing response 204 followed by lower frequency ringing response 206. For example, signal $V_{GATE}$ goes HIGH after time period $t_{off}$ has expired and after a zero crossing detector has detected a valley in the response of $V_{DS}$.

Figure 6:
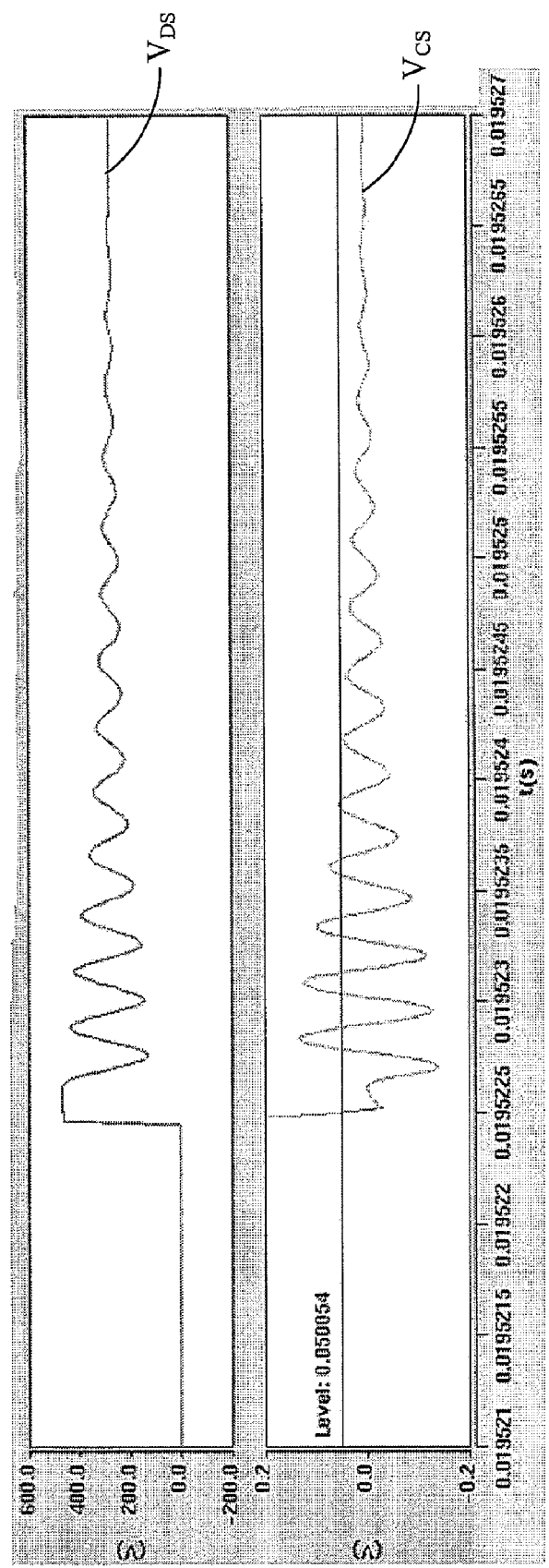

FIG. 6 illustrates a waveform diagram showing the relationship between voltage $V_D$ at the drain of transistor 122 and voltage $V_{CS}$ at the source of transistor 122. For example, in the illustrated embodiment, voltage $V_{DS}$ initially has a peak-to-peak amplitude of about 300V, while the voltage at $V_{CS}$ initially has a peak amplitude of about 300 mV. The ratio of the amplitude of $V_{CS}$ to $V_{DS}$ depends on capacitance $C_D$ and the impedance seen at node $V_{CS}$ at the source of transistor 122. In embodiments of the present invention, $C_D$ is the parasitic capacitance between the source and drain of the power MOSFET. Its value of $C_D$ is dependent on the size of the power MOSFET. In alternative embodiments of the present invention, other amplitude ratios between $V_{CS}$ and $V_D$ can be used, and other methods of forming capacitance $C_D$ can be implemented.

Figure 3:
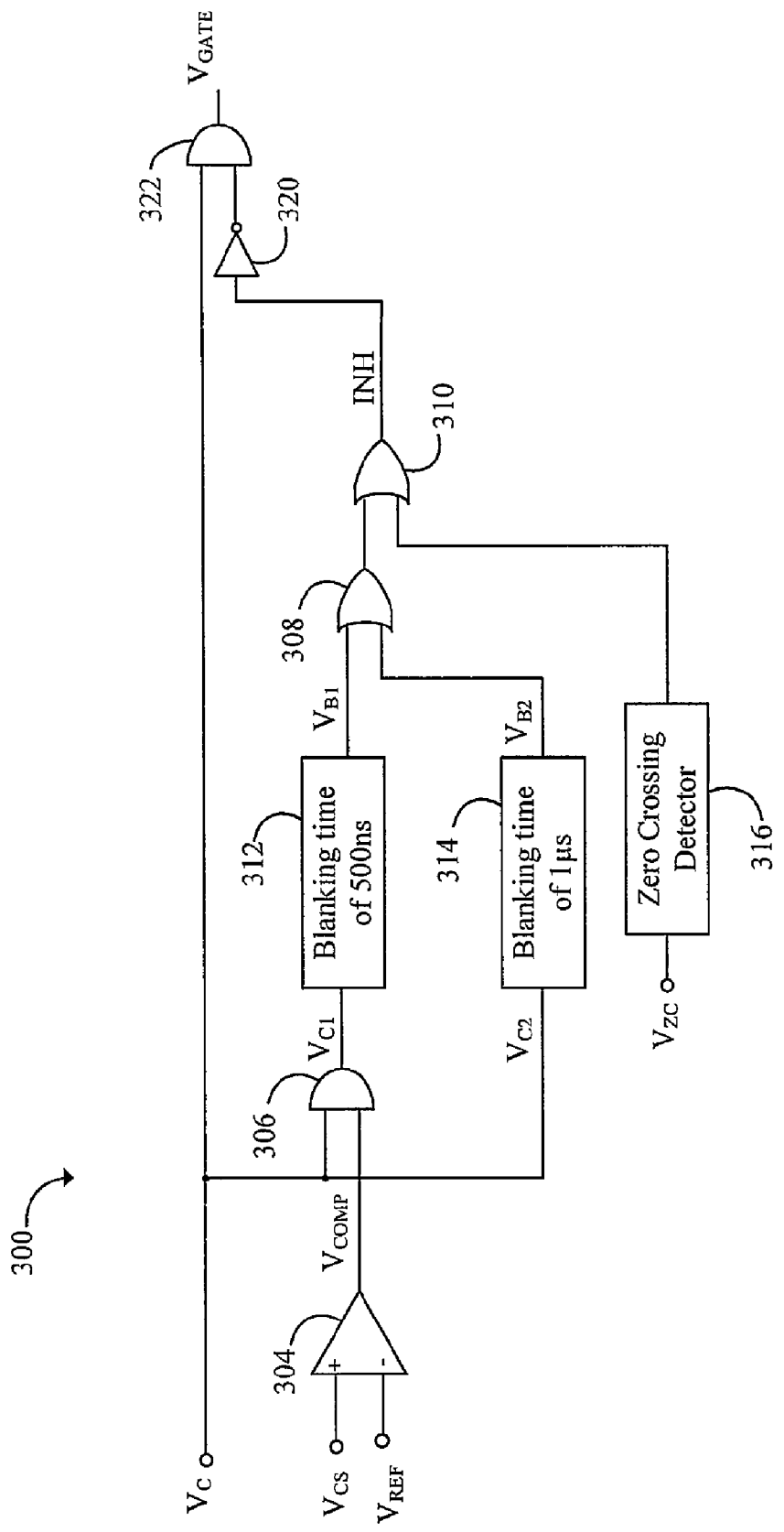
FIG. 3 illustrates an embodiment gate inhibit circuit.

FIG. 3 illustrates a functional schematic of gate inhibit circuit 300. Comparator 304 compares voltage $V_{CS}$ at the source of transistor 112 (FIG. 1) with reference voltage $V_{REF}$. In some embodiments of the present invention, $V_{REF}$ is about 50 mV. In embodiments of the present invention that shift the DC level of $V_{CS}$ to a different DC bias voltage $V_{BIAS}$, using, for example, current source 112 and resistor $R_S$ (FIG. 1), $V_{REF}$ is about $V_{BIAS}$+50 mV. VBIAS is used in embodiments where the ringing level is too low to be detected. In alternative embodiments of the present invention, other reference voltage levels can be used.

When the output $V_C$ of PWM generator 104 (FIG. 1) becomes inactive, (i.e. transistor 122 is shut off) 500 ns blanking time generator block 312 is activated if $V_{COMP}$ goes HIGH as a result of $V_{CS}$ exceeding $V_{REF}$. The output of block 312 goes HIGH when the input to the block goes HIGH, and the output of block 312 remains HIGH for 500 ns after the falling edge of its input as shown in FIG. 4a.

In an embodiment of the present invention, 1 μs blanking time block 314 is activated when voltage $V_{C2}$ goes HIGH, and is deactivated 1 μs after voltage $V_{C1}$ goes LOW again as shown in FIG. 4b. Outputs $V_{B1}$ and $V_{B2}$ are combined via OR gate 308, the output of which is further ORed with the output of zero crossing detector 316 with OR gate 310. When output INH of OR gate 310 is HIGH, $V_{GATE}$ is prevented from going HIGH. Logically, inhibiting $V_{GATE}$ from going HIGH is represented by AND gate 322 and inverter 320. In alternative embodiments of the present invention, the logical functions of FIG. 3 can be implemented according to other techniques in the art or their logical equivalents.

Figure 5:
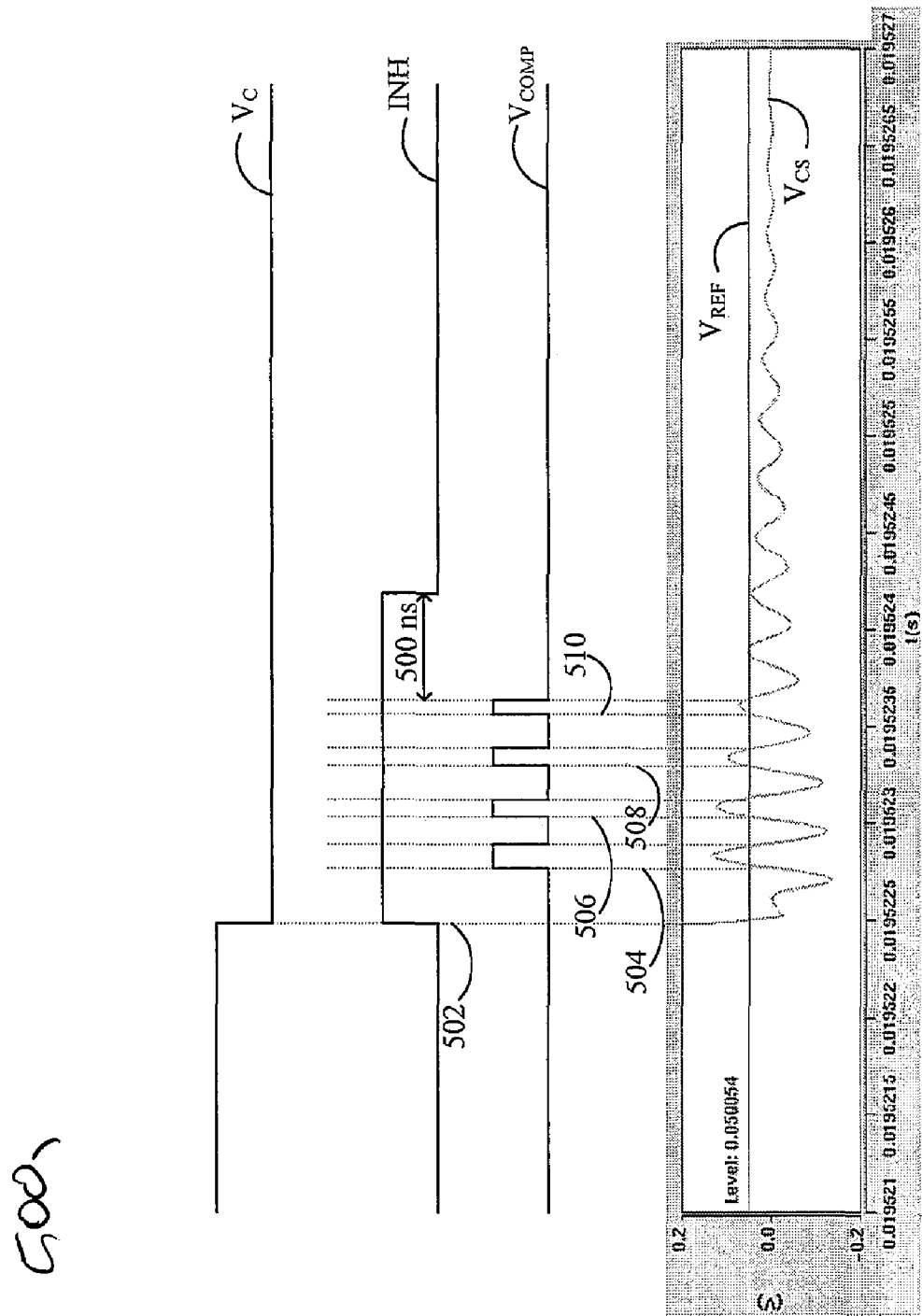
FIGS. 5 and 6 illustrate waveform diagrams of an embodiment switched-mode power supply.

Turning to FIG. 5, waveform diagram 500 of the gate inhibit circuit 300 (See FIG. 3) is shown. Signal INH becomes asserted at edge 502 when PWM generator output voltage $V_C$ goes LOW. When $V_{CS}$ exceeds $V_{REF}$, $V_{COMP}$ goes HIGH at edges 504, 506, 508 and 510. In the illustrated example, $V_{COMP}$ is HIGH when $V_{CS}$ exceeds about 50 mV. As shown, signal INH remains HIGH for 500 ns after the falling edge of $V_{COMP}$.

It will also be readily understood by those skilled in the art that materials and methods may be varied while remaining within the scope of the present invention. It is also appreciated that the present invention provides many applicable inventive concepts other than the specific contexts used to illustrate embodiments. Accordingly, the appended claims are intended to include within their scope such processes, machines, manufacture, compositions of matter, means, methods, or steps.

What is claimed is:

1. A method of operating a switched-mode power supply comprising a switch coupled to a drive signal, the method comprising:
   shutting off the switch with the drive signal at a first instance of time;
   after shutting off the switch, sensing a transient ringing condition within the switched-mode power supply, sensing comprising comparing a magnitude of a voltage of a power supply node to a threshold; and
   if the magnitude of the voltage of the power supply node exceeds the threshold, inhibiting the switch from turning on for a first time interval.

2. The method of claim 1, wherein the switch is coupled to a primary winding of the switched-mode power supply.

3. The method of claim 1, wherein the switch comprises a MOSFET.

4. The method of claim 3, wherein the power supply node comprises a source of the MOSFET.

5. The method of claim 4, further comprising offsetting the voltage of the power supply node when the switch is shut off.

6. The method of claim 1, further comprising inhibiting the switch from turning on for a second time interval starting from a first instance of time, wherein the switch is inhibited from turning on during the first time interval and during the second time interval.

7. The method of claim 6, wherein the first time interval comprises a duration of about 500 ns, and wherein the second time interval comprises a duration of about 1000 ns.

8. The method of claim 1, wherein the switched-mode power supply comprises a quasi-resonant converter.

9. A circuit for controlling a switched-mode power supply, the circuit comprising:
   a switch drive inhibit generator comprising
      a sensor configured to sense a transient ringing condition within the switched-mode power supply, the sensor comprising a comparator configured to compare a node voltage within the power supply to a reference voltage, the comparator comprising an output that is asserted when the node voltage exceeds the reference voltage, and
      a timer coupled to the comparator output, the timer configured to
         generate an inhibit signal while the comparator output is asserted, and
         generate the inhibit signal for a first duration after the comparator output is asserted.

10. The circuit of claim 9, further comprising a switch drive inhibit circuit coupled to the inhibit signal of the switch drive inhibit generator, the switch drive inhibit circuit comprising a switch signal input and a switch signal output, wherein the switch drive inhibit circuit is configured to inhibit the switch signal output when the inhibit signal is asserted.

11. The circuit of claim 10, further comprising a pulse-width modulator, the pulse width modulator configured to produce the switch signal input.

12. The circuit of claim 10, further comprising a pulse-width modulator controller coupled to the pulse-width modulator, the pulse-width modulator controller further comprising a feedback input.

13. The circuit of claim 10, wherein the switch signal output is configured to drive a MOSFET.

14. The circuit of claim 13, wherein the power supply node comprises a source of the MOSFET.

15. The circuit of claim 14, further comprising a current source configured to supply current to the power supply node while the switch signal output is not asserted.

16. A semiconductor circuit comprising the circuit of claim 10.

17. A power supply system comprising the semiconductor circuit of claim 16.

18. The method of claim 8, wherein the switched-mode power supply comprises a quasi-resonant converter.

19. A power supply system comprising:
a power supply controller integrated circuit (IC) comprising
 a switch drive circuit coupled to a switch driver controller circuit, wherein the switch drive circuit is configured to be coupled to a switch in the power supply system, and
 a sensor circuit coupled to the switch driver controller circuit, the sensor circuit configured to sense a transient signal with the power supply system, wherein the switch driver controller circuit is configured to inhibit the switch drive circuit from activating the switch in the power supply system for a first time duration from when the sensor circuit senses the transient signal within the power supply system.

20. The power supply system of claim 19, wherein the switch driver controller circuit is further configured to inhibit the switch drive circuit from activating the switch for a second time duration from when the switch drive circuit activates the switch.

21. The circuit of claim 19, wherein the sensor circuit comprises a comparator comprising a first input coupled to a reference voltage and a second input coupled to an input node, the input node configured to be coupled to a node within the power supply system.

22. The power supply system of claim 21, further comprising a switch comprising a gate coupled to the switch drive circuit and a source coupled to the input node of the sensor circuit.

23. The power supply system of claim 19, wherein the power supply system comprises a quasi-resonant converter.

* * * * *